United States Patent [19]
Wiley

[11] Patent Number: 5,203,287
[45] Date of Patent: Apr. 20, 1993

[54] OSCILLATING PISTON ENGINE

[75] Inventor: Bruce C. Wiley, Grover City, Calif.

[73] Assignee: Tommy Hasbun, Arroyo Grande, Calif. ; a part interest

[21] Appl. No.: 927,131

[22] Filed: Aug. 7, 1992

[51] Int. Cl.$^5$ .............................................. F02B 53/00
[52] U.S. Cl. ................................ 123/18 A; 123/18 R; 123/51 R; 123/51 BC
[58] Field of Search ................ 123/18 R, 18 A, 51 R, 123/51 BC

[56] References Cited

U.S. PATENT DOCUMENTS

| | | | |
|---|---|---|---|
| 1,294,487 | 2/1919 | Laberge | 123/18 A |
| 3,516,392 | 6/1970 | Morgan | 123/18 A |
| 3,602,203 | 8/1971 | Mowry | 123/18 A |
| 3,644,069 | 2/1972 | Stewart | 123/18 A |
| 4,662,177 | 5/1987 | David | 123/18 A |
| 5,074,253 | 12/1991 | Dettwiler | 123/18 A |

*Primary Examiner*—David A. Okonsky
*Assistant Examiner*—M. Macy
*Attorney, Agent, or Firm*—Klein & Szekeres

[57] ABSTRACT

An internal combustion engine has a rotating annular cylinder containing a plurality of mutually oscillating pairs of pistons, one of each pair being rigidly fixed to a first axially-oscillating tube, the other of each pair being fixed to a second such tube concentric with the first. Each of the tubes is connected, by a "Scotch yoke", to a crank throw on a crank shaft. Each Scotch yoke includes an arm fixed at one end to its associated tube for oscillation therewith. The arm includes an elliptical slot that carries an annular ball bearing race for movement therein, one crank throw being journaled within each race. The cylinder is rotated by the crankshaft through a gear train in a fixed ratio to the rotation rate of the shaft. The pistons, having conical end faces, impart a rotational motion to the crankshaft during the power stroke of the cycle, the rotation of the crankshaft, in turn, imparting an oscillation to the piston pairs to actuate them in accordance with the strokes of the engine cycle. The rotation of the cylinder brings the piston pairs into registration with spark plugs, intake ports, and exhaust ports at appropriate times during the cycle. A magnetic ignition system is employed, in which magnetic transducers on the cylinder are rotated past an array of magnets to generate triggering pulses that are transmitted to an ignition voltage generation circuit, which, in response, delivers an ignition voltage to the spark plugs at the appropriate time.

20 Claims, 5 Drawing Sheets

OSCILLATING PISTON ENGINE

BACKGROUND OF THE INVENTION

This invention relates generally to the field of internal combustion engines. Specifically, this invention relates to certain improvements in a type of internal combustion engine that has a plurality of oscillating pairs of pistons contained within a rotating annular cylinder.

The oscillating piston/rotating cylinder engine has been described in U.S. Pat. No. 3,516,392 - Morgan. In this type of engine, an annular cylinder is rotated in a predetermined ratio to the oscillations of a plurality of pairs of oscillating pistons contained within the cylinder. The pistons are oscillated so that adjacent pistons in each pair are moved alternately toward and away from each other for the respective strokes of a four-stroke cycle internal combustion engine. Intake ports, exhaust ports, and ignition means in the rotating cylinder are located by the rotation of the cylinder with respect to the pistons in accordance with the firing order and cycle of the engine.

While the Morgan engine is capable of favorable efficiencies as compared with those of conventional reciprocating piston engines, increasingly rigid standards of fuel economy and emissions control have made further improvements in mechanical and thermal efficiency highly desirable. In this regard, for example, the Morgan engine has a relatively large number of moving parts that add weight and complexity, and create frictional losses, while the design of the pistons (essentially disc-shaped, with flat sides) does not optimize the extraction of useful energy from combustion during the power stroke.

It would be highly desirable, therefore, to improve the Morgan engine, whereby the advantages of the basic oscillating piston/rotating cylinder design are retained, while increasing efficiency by reducing the number of moving parts and optimizing piston design.

SUMMARY OF THE INVENTION

Broadly, the present invention is an oscillating piston/rotary cylinder internal combustion engine, of the type described in U.S. Pat. No. 3,516,392 (the disclosure of which is incorporated herein by reference), wherein the improvements include: (a) the use of unitary oscillating power arms (rather than articulated crank arms), of the "Scotch yoke" type, to transmit power from the torque tubes to the crank shaft; (b) the use of pistons, having conical surfaces, that are rigidly connected to the torque tubes that transmit power from the pistons to the crankshaft via the power arms; (c) a magnetic, Hall effect ignition system (instead of a gear-and-shaft driven point/contact distributor); and (d) a plurality of relatively small balancing discs integral with the crankshaft, at least one of which is journaled in an annular ball bearing race.

These improvements may be more specifically described as follows:

Each of the "Scotch yoke" power arms comprises an elongate arm member having a circular aperture near one end, through which one of the torque tubes passes. The torque tube is fixed to the arm within the aperture. An elliptical aperture near the other end of the arm receives a ball bearing follower that is concentrically carried on a crank throw of the engine's crank shaft. By this arrangement, the rotational or axial oscillation of the torque tube is first translated into a back-and-forth oscillation of the crank shaft end of the arm, and then translated into a rotation of the crank shaft. The Scotch yoke power arms thus replace the crank arm, connecting rod, and crank pin of the prior art Morgan engine with an assembly that provides a more direct connection, with lower frictional losses, between the crank shaft and the torque tube, thereby more efficiently transmitting power from the pistons to the crank shaft via the torque tubes.

Each of the pistons of the engine constructed in accordance with the present invention is configured with a pair of oppositely-directed, conical faces. The pistons in each mutually-oscillating pair of pistons thus have opposed conical surfaces facing each other to form a substantially conical chamber when they approach each other during the compression stroke. This conical combustion chamber provides increased combustion efficiency, while allowing the compression ratio to be selected by appropriately selecting the slope of the piston surface.

This combustion chamber configuration also eliminates, or at least minimizes, the pressure spike associated with combustion in the flat-sided combustion chamber formed by the disc-shaped pistons in the Morgan engine. Moreover, compression damping at the end of combustion is progressive in the present invention, as opposed to linear in the Morgan engine, because of the conical piston faces.

While the pistons of the Morgan engine are loosely mounted by pins onto arms extending from a center holder that is fastened to a torque tube, each of the pistons in the present engine is rigidly fixed to one of a pair of annular flanges, each of which, in turn, is fixed to one end of one of the torque tubes. As compared with the piston arrangement of the Morgan engine, the present arrangement provides better balance, reduced vibration, lower frictional losses, and more efficient transfer of power to the torque tubes.

In the Morgan engine, ignition is accomplished by means of a conventional spark ignition system, using a timing mechanism (presumably a distributor) that is operated by a shaft driven by the crank shaft through a gear train. Electric current is provided to the spark plugs through conductor rings on an exhaust pipe that rotates with the cylinder. The rings make contact with stationary brushes that are connected to a voltage source (i.e., a generator or alternator) through the timing mechanism.

In the present invention, the spark plugs are fired by ignition modules mounted on the rotating cylinder. The ignition modules contain circuitry that is triggered to generate a spark-inducing voltage in response to magnetic pulses received, via magnetic pick-ups that rotate with the cylinder, from a plurality of magnets located at appropriate intervals around an annular holder mounted on the crankcase. The current that creates the spark is delivered to the ignition modules by a brush and slip ring arrangement. This new ignition system provides for more precise spark timing, while adjustment of spark advance can be effected by rotating the magnet holder with respect to the crankcase. Moreover, the gear-and-shaft mechanism for driving the ignition timing mechanism is eliminated, along with its frictional losses, thereby increasing engine efficiency.

The Morgan engine uses a single, relatively massive flywheel at the distal end of the crankshaft. The present invention replaces this single flywheel with three smaller flywheels, or balancing discs, located at spaced intervals along the crankshaft, with the center balancing disc (at least) being journaled within an annular ball bearing race. The result is improved smoothness of operation, better support for the crankshaft, and less crankshaft vibration, as compared with the Morgan engine.

The above summary provides an overview of the major advantages of the present invention over the prior art Morgan engine. These and other advantages will be more fully developed in the detailed description that follows.

DETAILED DESCRIPTION OF THE PREFERRED EMBODIMENT

Referring now to the drawings, an oscillating piston/rotating cylinder engine 10, in accordance with a preferred embodiment of the present invention, will be described. This disclosure will focus primarily on the novel aspects of the present invention. For a description of the general structure and principles of operation of an oscillating piston/rotating cylinder engine, the reader is referred to U.S. Pat. No. 3,516,392 - Morgan, the disclosure of which is incorporated herein by reference, as previously mentioned.

The engine 10 includes a crankcase 12, in which a rotatable, generally annular cylinder 14 is mounted. The cylinder 14 contains a plurality of mutually-reciprocating pairs of pistons 16. In the preferred embodiment, there are four such pairs of pistons, at 90° intervals around the cylinder.

In each pair of pistons, one piston is rigidly fixed to a first annular flange 18 that defines the proximal end of a first, or outer, torque tube 20. The other piston in the pair is rigidly fixed to a second annular flange 22 that defines the proximal end of a second, or inner, torque tube 24, disposed concentrically within the outer torque tube 20. The pistons are preferably secured to their respective flanges by welding, but attachment means such as roll pins may be used. The torque tubes 20, 24 are generally concentric with the cylinder 14.

The cylinder 14 includes a tubular hub 25 that is rotatably supported, in the crankcase 12, between a first tubular sleeve bearing 26 (preferably made of PTFE) and a first plurality of roller bearings 27a. The torque tubes 20, 24 extend axially through the first sleeve bearing 26. A second tubular sleeve bearing 28 (also preferably made of PTFE) is disposed between the two torque tubes. The distal end of the outer torque tube is rotatably journaled between the second sleeve bearing 28 and a second plurality of roller bearings 27b. The inner torque tube 24 is rotatably supported, near its distal end, by a third plurality of roller bearings 27c. The distal end of the inner torque tube 24 is provided with a peripheral flange 29 for axial retention. An anti-friction washer (not shown) may advantageously be provided between the flange 29 and the crankcase 12.

Thus, the hub 25 and the torque tubes 20, 24 are concentrically aligned along a common axis of rotation, and are independently rotatable with respect to one another, by virtue of the sleeve bearings 26, 28 and the roller bearings 27a, 27b, 27c.

The annular cylinder 14 is formed from a pair of circumferentially-divided cylinder segments, an outer segment 30a, and an inner segment 30b, that fit together to define a generally annular cylinder chamber 31 within the cylinder 14. Both cylinder segments 30a, 30b are provided with a plurality of radial cooling fins 32 at spaced intervals on its exterior surface. Each of the cylinder segments 30a, 30b has an exterior flange 33, and the flanges 33 are removably secured to each other by suitable means, such as bolts 34. The cylinder hub 25 extends axially from the inner segment 30a.

Figure 2:
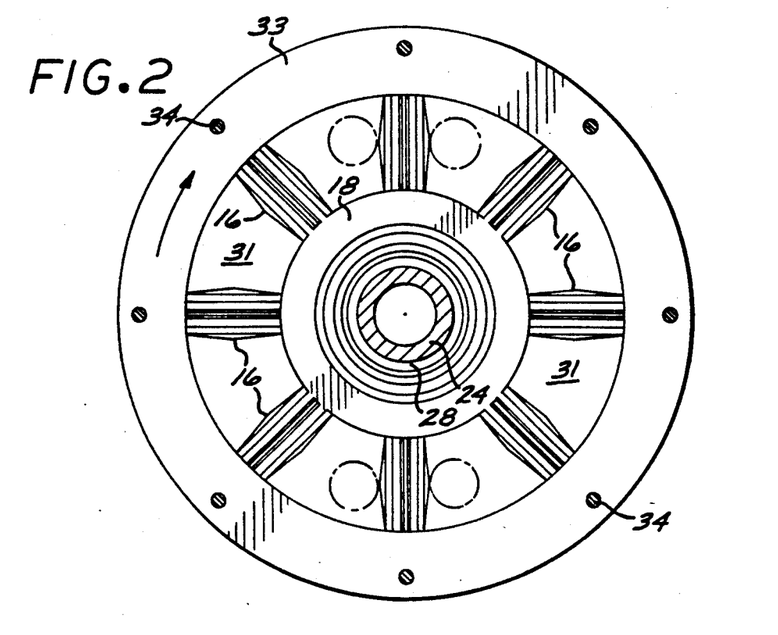
FIG. 2 is a cross-sectional view of the engine, taken along line 2—2 of FIG. 1.
Figure 5:
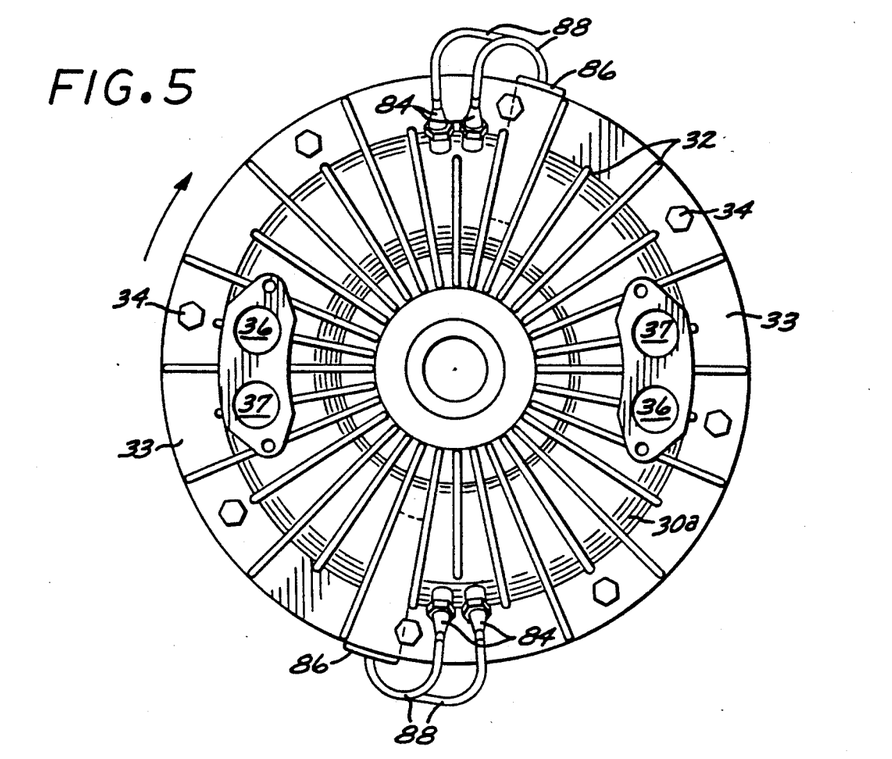
FIG. 5 is an elevational view of the engine, taken along line 5—5 of FIG. 1.

As shown in FIGS. 2 and 5, the outer cylinder segment 30a is provided with a pair of diametrically-opposed intake ports 36, each of which communicates with an intake manifold (not shown). A pair of diametrically-opposed exhaust ports 37 are also provided in the outer cylinder segment 30a, offset from the intake ports 36 by about 22.5°. The exhaust ports 37 communicate with an exhaust manifold (not shown).

In the preferred embodiment of the invention, the cylinder 14 (including the hub 25), the pistons 16, and the torque tubes 20, 24 are formed of 6061-T6-511 aluminum alloy.

Figure 3:
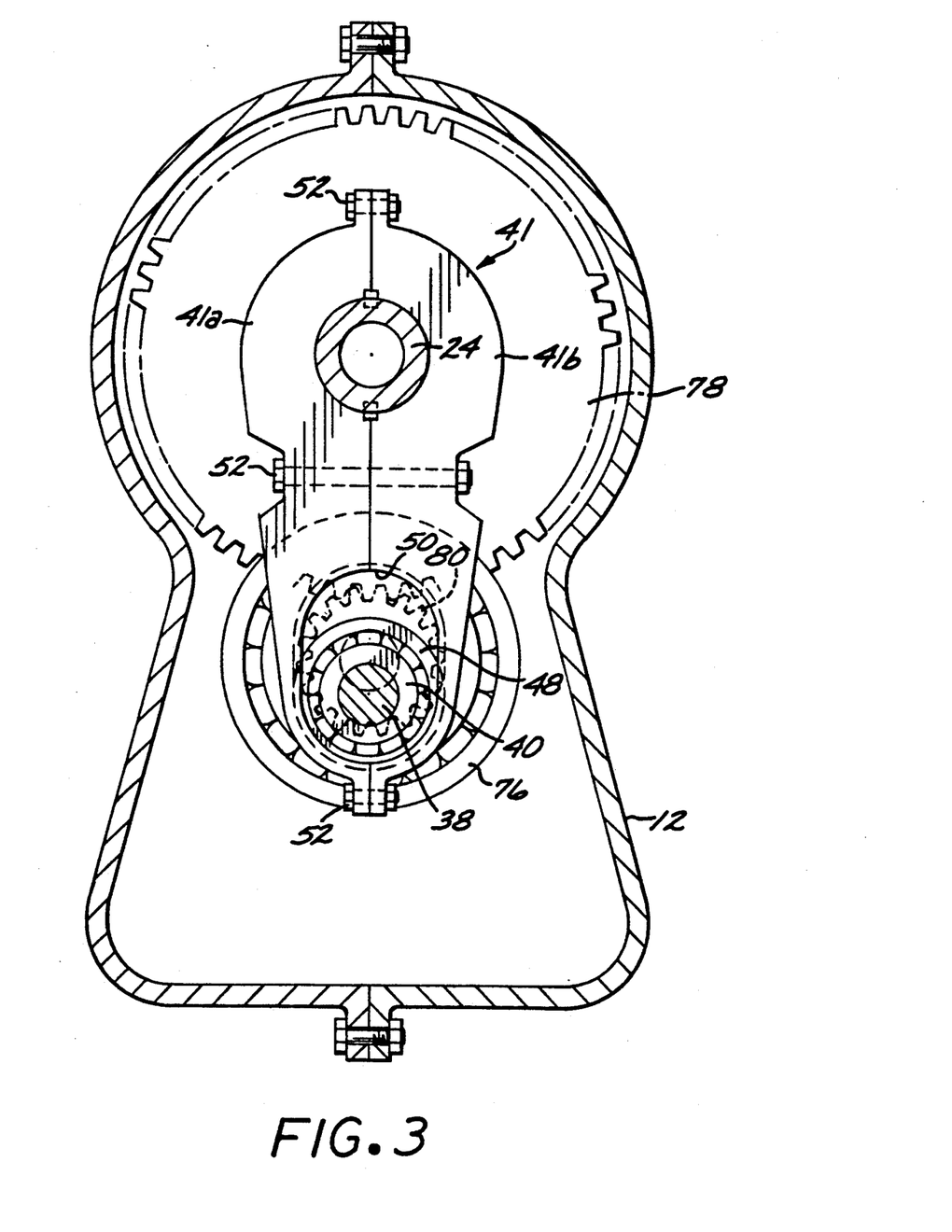
FIG. 3 is a cross-sectional view of the engine, taken along line 3—3 of FIG. 1.
Figure 4:
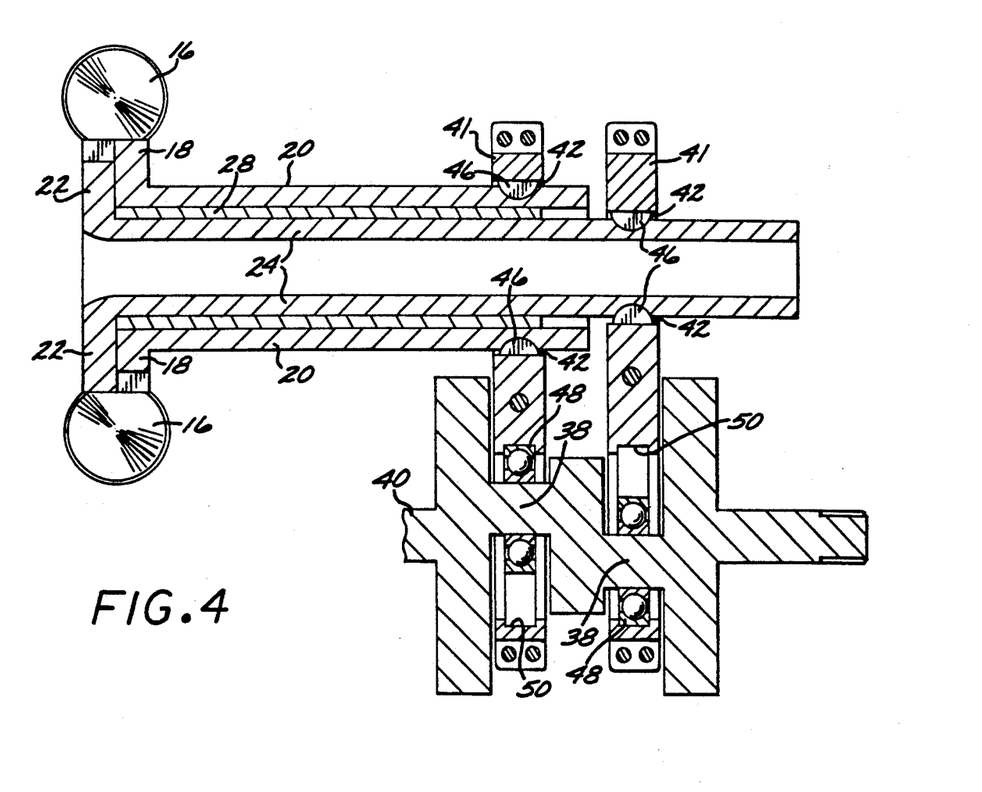
FIG. 4 is a longitudinal cross-sectional view of the engine, similar to that of FIG. 1, showing the pistons, torque tubes, Scotch yoke power arms, and crankshaft in further detail.

Each of the torque tubes 20, 24 is connected, by means of a so-called "Scotch yoke" mechanism, to a crankthrow 38 on a crankshaft 40 rotatably journaled in the crankcase 12. As best shown in FIGS. 3 and 4, the Scotch yoke mechanism comprises a power arm 41 formed from two mating arm halves 41a, 41b, preferably made from the same aluminum alloy as the torque tubes. Each of the arm halves has a semicircular recess near its upper end (as oriented in FIG. 3), and a semi-elliptical recess near its lower end.

The semicircular recess has upper and lower slots 42, as best shown in FIG. 4. Each torque tube is provided with a groove near its distal end that registers with the slots 42. The arm halves are assembled onto the torque tube with the arm slots 42 registering with the torque tube grooves, and a key member 46 is inserted between each of the slots and its registering groove to form a "Woodruff" key that firmly secures the arm onto the tube, with the tube thereby extending through the circular aperture formed by the registering semicircular recesses of the arm halves. The arm is thus rigidly fastened onto the tube, so that it rotates with the tube with neither axial nor circumferential slippage.

An annular ball bearing race 48 is installed on each of the crank throws 38. When the arm halves 41a, 41b of each arm are assembled onto their respective torque tubes, the semi-elliptical recesses in the arm halves form an elliptical aperture 50. During assembly, and before the arm halves are rigidly secured to each other and to the tube, the ball bearing race 48 is captured between the semi-elliptical recesses, so that it becomes seated in the elliptical aperture 50. The arm halves are then rigidly fixed to each other and to the tube by means such as bolts 52. The ball bearing race 48 is thus free to ride within the elliptical aperture, along the axis of the aperture, with the movement of the crank throw 38.

It will be appreciated that this Scotch yoke assembly provides a secure, positive mechanical linkage between the torque tubes 20, 24 and the crankshaft 40, with fewer moving parts than the articulated, connecting rod linkage of the prior art. Thus, frictional losses are reduced, thereby increasing the efficiency of power transfer.

Figure 1:
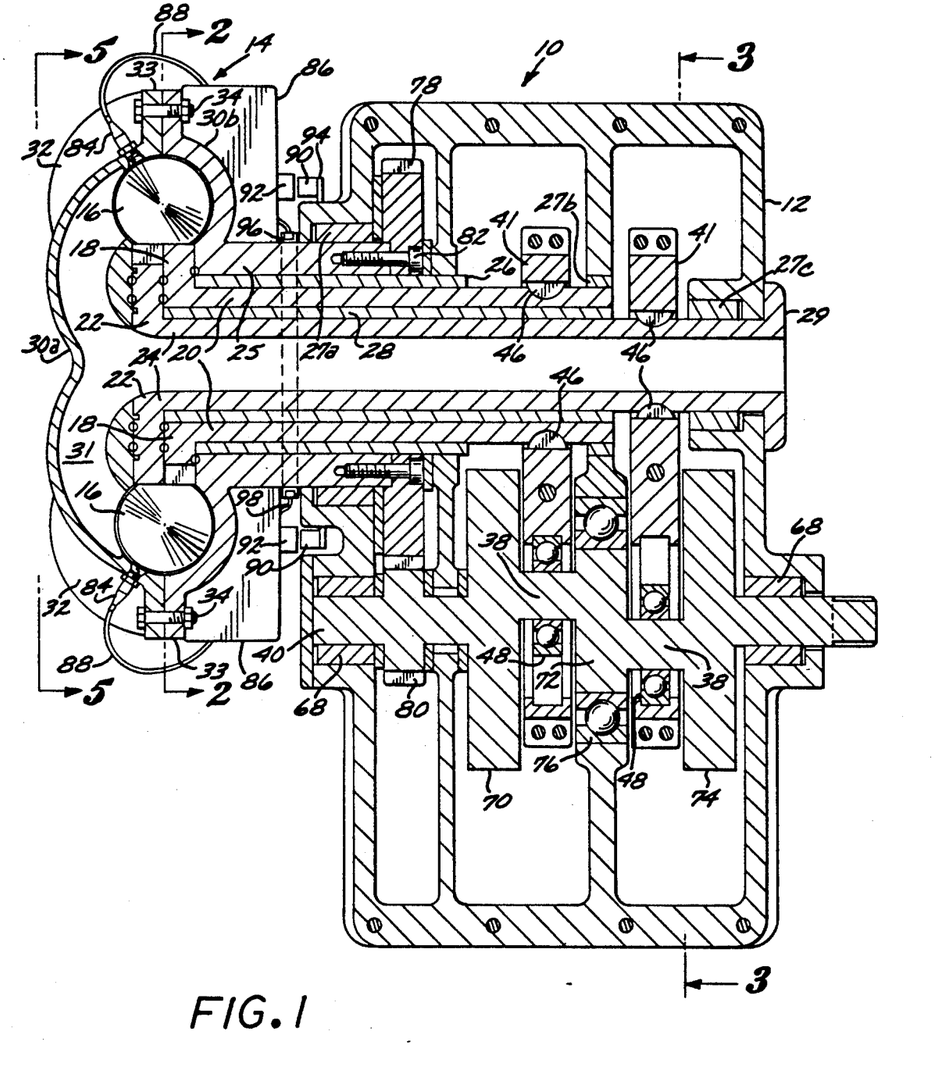
FIG. 1 is a longitudinal cross-sectional view of an improved oscillating piston engine, in accordance with a preferred embodiment of the present invention.
Figure 6:
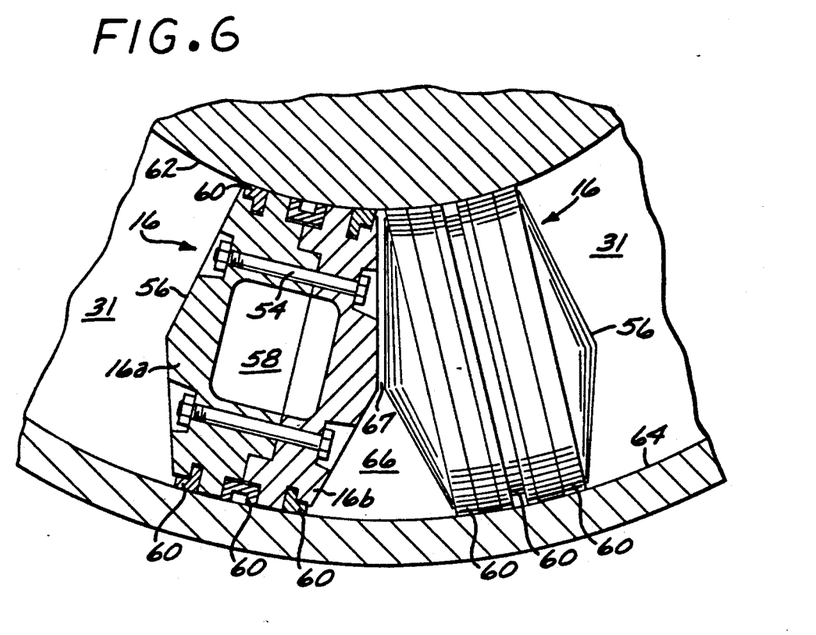
FIG. 6 is a detailed, partly cross-sectional view of a portion of the cylinder of the engine, showing a pair of mutually oscillating cylinders, one in cross-section, and one in elevation.

Turning now to FIGS. 1, 4, and 6, the novel piston arrangement of the present invention is described. Each of the pistons 16 comprises a pair of mating, complementary piston segments 16a, 16b that, when secured to each other, as by bolts 54, form a somewhat cylindrical piston body with oppositely-directed conical faces 56. The piston segments are preferably formed so that, when assembled, they define a hollow interior cavity 58 to save weight and to reduce inertial stresses resulting from the oscillation of the pistons.

In actuality, as shown in FIG. 6, the body of each piston is not perfectly cylindrical; it has an axial radius of curvature that allows it to conform to the radius of curvature of the cylinder chamber 31. In addition, the piston body includes several circumferential grooves, into each of which is seated a cast iron compression ring 60 having a right-angle cross-section. The piston 16 thus seats against the inner wall 62 and outer wall 64 of the cylinder chamber 31, yet is free to oscillate within the chamber 31. The right-angle compression rings 60 are pressure-flexed against the walls of the cylinder chamber 31, so that their sealing effect is enhanced under compression.

The conical piston faces 56 are configured so that, during the compression stroke, a substantially conical combustion chamber 66 is formed between each mutually-oscillating pair of pistons, the apex of the combustion chamber 66 being directed inwardly, toward the inner wall 62 of the cylinder chamber 31. This configuration of the combustion chamber 66 enhances the creation of an advantageous flame front progression throughout the volume of the combustion chamber upon ignition of the fuel, thereby providing a more efficient burn for improved fuel economy and reduced emissions, as compared with the flat-faced pistons of the prior art. Moreover, this configuration eliminates, or at least minimizes, the pressure spike associated with combustion in the flat-sided combustion chamber formed by flat-faced pistons, thereby substantially reducing inertial stress and vibration.

As shown in FIG. 6, at the end of the compression stroke a gap 67 exists between the two pistons, extending from the apex of the combustion chamber 66 to the inner wall 62 of the cylinder chamber 31. This gap 67 provides a "squish band" during combustion that produces an advantageous distribution of combustion pressure, thereby enhancing the engine's thermal efficiency (the extraction of mechanical energy from the combustion).

Furthermore, near the end of the power stroke, as each piston is propelled toward a piston in an adjacent mutually-oscillating piston pair, the approaching conical piston faces create a compression damping that is progressive along each face, thereby further reducing the inertial stress on each piston at the limit of its travel, as compared with flat-sided pistons.

The crankshaft 40, machined from a single piece of chrome molybdenum steel, is journaled within the crankcase 12 on an axis parallel with the axis of the tubes 20, 24, and with the axis of rotation of the cylinder. The crankshaft 40 is advantageously supported at both ends by suitable bearing means such as roller bearings 68. A plurality of balancing discs, namely, a proximal balancing disc 70, a central balancing disc 72, and a distal balancing disc 74, are provided at spaced intervals along the length of the crankshaft 40. The balancing discs (preferably at least three, as shown) are advantageously formed as integral parts of the crankshaft 40. The central disc 72 is preferably slightly smaller in diameter than the outer discs 70, 74, and it is journaled within an annular ball bearing race 76 mounted within the crankcase. The discs 70, 72, 74 provide for a smoothly continuous rotation of the crankshaft 40, with minimal vibration, and thus replace the single large flywheel of the prior art, while providing better balance for the shaft.

The cylinder 14 is driven by the crankshaft 40 in a 4:1 ratio through a gear train comprising a large annular spur gear 78 that meshes with a small annular spur gear 80. The large gear 78 concentrically surrounds the tubular cylinder hub 25 and the torque tubes 20, 24, and it is secured to the distal end of the hub 25 by means such as bolts 82. The small gear 80 is secured to the crankshaft 40 between the proximal balancing disc 70 and the proximal end of the shaft. Thus, the crankshaft 40 undergoes four revolutions for each revolution of the cylinder 14.

As previously mentioned, the present invention employs four mutually-oscillating pairs of pistons 16. One piston in each pair is fixed to the first annular flange 18 on the outer torque tube 20, and the other piston in each pair is fixed to the second flange 22 on the inner torque tube 24. The crank throws 38 on the crankshaft 40 are 180° apart, so that the Scotch yoke arms 41 axially rotate, or oscillate, their respective torque tubes 20, 24 generally in opposite directions as the crankshaft rotates, thereby moving the pistons 16 in each mutually-oscillating pair in opposite directions, either toward or away from each other. The Scotch yoke arms 41 are at such an angle with respect to each other as to oscillate the pistons 16 on each tube 20, 24 in accordance with the cycle of operation of the engine, as determined by the rotation of the cylinder 14, as will be described below. Since the crank shaft 40 undergoes four revolutions for each revolution of the cylinder 14, each mutually-oscillating pair of pistons 16 move toward and away from each other eight times during each complete revolution of the cylinder 14. The stroke of movement of each piston 16 in either direction is therefore one-sixteenth of a revolution, or 22.5°. Accordingly, the Scotch yoke arms 41 are at a 22.5° included angle about the center of oscillation when the crank throws are in their extreme positions with respect to the arms 41, i.e., when the ball bearing races 48 are at their extremes of travel within the elliptical aperture 50 in the arms 41. The preferred embodiment of the invention employs a spark plug ignition system, as illustrated in FIGS. 1 and 5. The spark ignition system preferably is a dual spark system, employing first and second pairs of spark plugs 84 at diametrically opposite positions within the cylinder 14. (A single spark system, employing single plugs at diametrically opposite positions, can also be used.) Each pair of spark plugs 84 is fired by a solid state ignition voltage generation device 86, mounted between two adjacent cooling fins 32 on the exterior of the cylinder 14, and connected to the spark plugs 84 by suitable ignition wires 88. The ignition voltage generation devices 86 are of a type that is triggered to generate an ignition voltage pulse in response to an electrical pulse of predetermined amplitude and/or duration. Such devices are commercially available from several sources, such as C.H. Electronics, of Riverton, Wyo., and GKD Products, of Garland, Tex. The devices 86 are modified for use in the present invention only by packaging their circuitry in a housing that can be installed between the cooling fins 32, as shown.

The magnetic means for generating the triggering pulses comprise eight magnets 90, and a pair of Hall effect magnetic transducers or pick-ups 92. The magnets 90 are equidistantly spaced, at 45° intervals, around an annular magnet holder 94 that is fixed to the crankcase 12 so as to face the magnets 90 toward the cylinder 14. The pick-ups 92 are fixed to the inner cylinder segment 30b in diametrically opposite positions, facing the magnets 90, such that the rotation of the cylinder 14 brings the pick-ups 92 into close proximity to each of the magnets 90 in turn. Each of the pick-ups 92 is electrically connected to one of the ignition voltage generation devices 86, to deliver an electrical pulse of the appropriate amplitude and/or duration each time it passes a magnet 90.

Current from an electrical power source, such as a battery (not shown) or an alternator (not shown), is delivered to the ignition voltage generation devices 86 through a slip ring 96 mounted on the cylinder hub 25 to rotate therewith. Electrical contact between the slip ring 96 and the positive terminal of the power source is established through a plurality of brushes (not shown). A wire 98 electrically connects the slip ring 96 to each of the ignition voltage generation devices 86. The negative terminal of the power source, and the ground leads of the spark plugs 84, are connected to the crankcase.

As described above, each of the two ignition voltage generation devices 86 is triggered to fire its associated pair of spark plugs 84 each time its associated pick-up 92 passes by a magnet 90 during rotation of the cylinder. Thus, each of the two spark plug pairs fires eight times during a complete revolution of the cylinder, yielding a total of sixteen firings or power strokes for each revolution of the cylinder.

The spark plug ignition system described above can be used with such fuels as gasoline, gasohol, alcohol, or propane, and is the preferred ignition system for high-power applications, i.e., over 100 horsepower.

Alternatively, a glow plug ignition system can be used. In the present invention, the spark plugs 84 would be replaced by glow plugs that would be continuously heated by an electrical current from a suitable electrical power source, the current being delivered to the glow plugs directly via wires connected to the slip ring 96. In such a system, of course, the magnets, magnet pick-ups, and ignition voltage generation devices would be omitted. The glow plug ignition would be advantageous for use in relatively low power, small capacity engines, using gasoline, gasohol, alcohol, or propane as fuel.

As another alternative, the engine could be run on a diesel cycle, using glow plugs that are energized only during start-up. The compression ratio would have to be substantially increased (as compared with Otto cycle operation) by suitably reconfiguring the piston surfaces, as alluded to above, to provide compression ignition.

Figures 7, 8, 9:
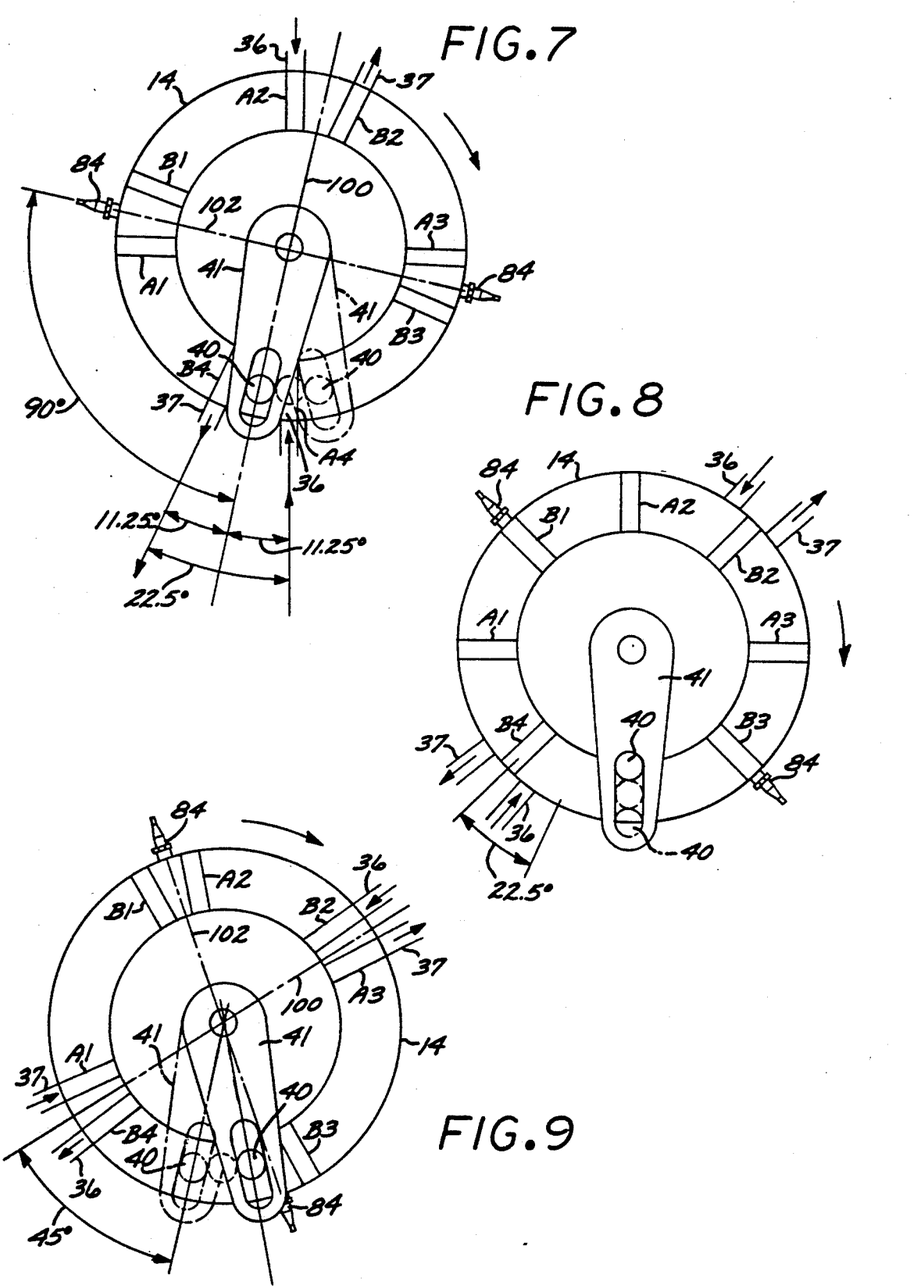
FIGS. 7, 8, and 9 are diagrammatic views illustrating the relative positions of the pistons, the intake and exhaust ports, and the ignition means during an operational cycle of the engine.

The order of firing and oscillation is shown diagrammatically in FIGS. 7, 8, and 9. In these diagrams, the pistons connected to the inner torque tube 20 are marked by designations A1, A2, A3, and A4. These pistons are respectively paired with the pistons designated B1, B2, B3, and B4 that are connected to the outer torque tube 24.

FIG. 7 corresponds to the position of the crankshaft 40 and the power arms 41 shown in FIG. 4. In this position, the piston pairs A1, B1 and A3, B3 have completed the compression stroke and are in position for ignition The piston pairs A2, B2 and A4, B4 have just completed their exhaust strokes. The spaces between the pistons A1 and B4, and between the pistons A3 and B2 are respectively expanded as the power strokes are completed, and these spaces are now ready for the exhaust stroke. The spaces between the pistons B1 and A2, and between the pistons B3 and A4 have been fully expanded at the completion of the intake stroke, and these spaces are now ready for their respective compression strokes.

The cylinder 14 rotates clockwise (as viewed in FIGS. 7, 8, and 9), while the crankshaft rotates counterclockwise (through the gears 78, 80). Each of the two intake ports 36 is paired with an exhaust port 37, and the intake/exhaust port pairs are located on diametrically opposite sides of the cylinder 14. In each intake/exhaust port pair, the intake port 36 and the exhaust port 37 are separated by 22.5°, to correspond to the 4:1 ratio of rotation between the crankshaft 40 and the cylinder 14, and to the corresponding stroke of oscillation of the pistons. As the crankshaft 40 rotates 90° from the position shown in FIG. 7 to the position shown in FIG. 8, the power arms 41 are oscillated in opposite directions by about 11.25°, so that they are in substantial alignment with each other. Correspondingly, the pistons A1, A2, A3, and A4 are moved one-half of their strokes in a counterclockwise direction, while the pistons B1, B2, B3, and B4 are moved clockwise by the same amount. This corresponds to a power stroke, whereby the pistons A1 and B1 are pushed apart from each other, as are the pistons A3 and B3. At the same time, the pistons A2 and B1 move together for a compression stroke, as do the pistons A4 and B3.

The space between the pistons A2 and B2, and the space between the pistons A4 and B4 are each aligned with an intake port 36 and continue the intake stroke as each of the piston pairs A2, B2 and A4, B4 is respectively moved apart. The pistons A1 and B4, and the opposite pistons A3 and B2 continue to move together for the exhaust stroke as the spaces between them is aligned with the respective exhaust ports 37. Further rotation of the crankshaft another 90° from the position shown in FIG. 8 to the position shown in FIG. 9 oscillates the power arms 41 in mutually opposite directions, so that they assume a reversal of the positions they occupied in FIG. 7. This oscillation rotates the torque tubes 20, 24 to move the pistons so as to complete the expansion of the power strokes between the piston pairs A1, B1 and A3, B3. At the same time, the exhaust strokes between the pistons A1 and B4, and between the pistons A3 and B2 are completed, as are the compression strokes between the pistons A2 and B1, and between the pistons A4 and B3. As a comparison between FIGS. 7 and 9 will show, the cylinder 14 has moved through an arc of 45°, thereby advancing one of the spark plugs 84 to a position between the pistons A2 and B1, and the other spark plug 84 to a position between the pistons A4 and B3 for the next ignition.

The intake ports 36 and the exhaust ports 37 are equally spaced angularly from a diameter 100 of the cylinder 14 that is perpendicular to a diameter 102 that extends through the spark plugs 84. Therefore, one exhaust port 37 is advanced so as to approach the space between the piston pair A1, B1 for the next consecutive exhaust stroke. The diametrically opposite exhaust port 37 correspondingly approaches the space between the piston pair A3, B3.

By continued rotation of the crankshaft 40 over the remaining half of its revolution, the above-described operational cycle is repeated in sequence between the consecutive piston pairs.

The power generated by the power stroke is transmitted through the torque tubes 20, 24, then through the power arms 41 to rotate the crankshaft 40. In turn, the rotation of the crankshaft 40, acting through the gears 80 and 78, rotates the cylinder 14, while, through the action of the torque tubes 20, 24, the pistons 16 are correspondingly shifted into the successive positions for the strokes of the engine's operational cycle, as described above. Furthermore, the cooling fins 32 on the cylinder 14 provide sufficient cooling, during rotation of the cylinder, to obviate the need for a water cooling system, or any other supplemental cooling under normal operating conditions.

A number of advantages of the present invention, as compared with the prior art, have been described above. These advantages, taken together, provide an engine with relatively few moving parts, thereby substantially reducing frictional and inertial losses, and thus providing high thermal and mechanical efficiency in transferring usable power from the pistons to the crankshaft. It is contemplated that Otto cycle engines, constructed in accordance with the preferred embodiment described above, will achieve very high power to displacement ratios, on the order of 140 horsepower per liter. Moreover, such engines will achieve excellent fuel economy, owing to the highly efficient operation, and the efficient fuel burn provided by the unique piston/cylinder design will produce relatively low emissions.

While a preferred embodiment of the invention has been described herein, it will be appreciated that variations and modifications will suggest themselves to those skilled in the pertinent arts. For example, engines with more than four mutually oscillating cylinder pairs may be desirable for certain applications, and the changes needed to accommodate the additional cylinders will be readily apparent. A variety of cooling systems may be used, although the air cooling provided by the finned cylinder will be adequate for most applications. Different specific piston configurations may be employed to vary the desired compression ratio, as mentioned above. These and other variations and modifications should be considered within the spirit and scope of the present invention, as set forth in the claims that follow.

What is claimed is:

1. An internal combustion engine, of the type having a rotating annular cylinder containing a plurality of mutually oscillating pairs of pistons, first means for oscillating the pistons so as to move the pistons in each pair toward and away from each other in accordance with the strokes of the operational cycle of the engine, a crankshaft having at least two crank throws, second means coupled to the crank throws for converting the oscillation of the pistons during the power stroke of the cycle into rotation of the crankshaft, and third means for rotating the cylinder in response to the rotation of the crankshaft, wherein the engine includes an improvement in the second means, comprising:
   first and second concentric tubes aligned coaxially with the axis of rotation of the cylinder and journaled for rotation along said axis, each of the tubes having a proximal portion extending into the cylinder, and a distal portion spaced from the cylinder, one piston of each pair of pistons being rigidly fixed to the proximal portion of the first tube, and the other piston of each pair of pistons being rigidly fixed to the proximal portion of the second tube;
   a first rigid arm having a first end fixed to the distal portion of the first tube, and a second rigid arm having a first end fixed to the distal portion of the second tube, the first and second arms each having a substantially elliptical aperture spaced from its first end; and
   fourth means for journaling each of the crank throws in the elliptical aperture of one of the arms so as to operatively engage each of the arms with one of the crank throws;
   whereby the oscillation of the pistons axially rotates the first and second tubes in mutually opposite directions, thereby oscillating the first and second arms in mutually opposite directions to rotate the crankshaft by means of the engagement between the crank throws and the arms.

2. The engine of claim 1, wherein the first ends of the first and second arms are respectively fixed to the first and second tubes so that there is substantially no relative movement between each of the first ends and the tube to which it is fixed.

3. The engine of claim 1, wherein the fourth means includes an annular ball bearing race installed on each of the crank throws, each of the ball bearing races being seated within the elliptical aperture of one of the arms so as to be movable therein along the axis of the aperture.

4. The engine of claim 1, wherein the crankshaft includes a plurality of integral balancing discs at spaced intervals along its length.

5. The engine of claim 4, wherein at least one of the balancing discs is journaled within an annular ball bearing race.

6. The engine of claim 1, wherein each of the pistons includes a pair of oppositely-directed, substantially conical end faces.

7. The engine of claim 6, wherein the end faces are configured so that when the pistons in each mutually-oscillating pair of pistons are moved toward each other during the compression stroke of the cycle, they provide compression ignition for operation of the engine in the diesel cycle.

8. The engine of claim 1, wherein the engine further includes ignition means, comprising:
   at least two diametrically-opposed spark plugs disposed within the cylinder;
   magnet means fixed to the crankcase so as to be disposed toward the cylinder;
   magnetic pick-up means, mounted on the cylinder for rotation therewith, and disposed so as to be brought into proximity to the magnet means as the cylinder rotates, for generating a triggering pulse in response to the proximity the magnet means;
   an electrical power source; and ignition voltage generation means, electrically connected to the spark plugs, the magnetic pick-up means, and the electrical power source, for delivering an ignition voltage pulse to the spark plugs in response to the triggering pulse.

9. The engine of claim 8, wherein the magnet means includes at least eight magnets equidistantly spaced in a fixed annular arrangement, and wherein the magnetic pick-up means includes a pair of magnetic pick-ups mounted on the cylinder in diametrically opposed positions.

10. The engine of claim 9, Wherein the ignition voltage generation means are electrically connected to the electrical power source through a conductive slip ring mounted for rotation with the cylinder.

11. An internal combustion engine, of the type having an annular cylinder rotatably journaled within a crankcase and containing a plurality of mutually oscillating pairs of pistons, first means for oscillating the pistons so as to move the pistons in each pair toward and away from each other in accordance with the strokes of the operational cycle of the engine, a crankshaft, second means coupled to the crankshaft for converting the oscillation of the pistons during the power stroke of the cycle into rotation of the crankshaft, and third means for rotating the cylinder in response to the rotation of the crankshaft, wherein the improvement comprises:
   magnetic ignition means, comprising:
      at least two diametrically-opposed spark plugs disposed within the cylinder;
      magnet means fixed to the crankcase so as to be disposed toward the cylinder;
      magnetic pick-up means, mounted on the cylinder for rotation therewith, and disposed so as to be brought into proximity to the magnet means as the cylinder rotates, for generating a triggering pulse in response to the proximity of the magnet means;
      ignition voltage generation means, electrically connected to the spark plugs, the magnetic pick-up means, and the electrical power source, for delivering an ignition voltage pulse to the spark plugs in response to the triggering pulse.

12. The engine of claim 11, wherein the magnet means includes at least eight magnets equidistantly spaced in a fixed annular arrangement, and wherein the magnetic pick-up means includes a pair of magnetic pick-ups mounted on the cylinder in diametrically opposed positions.

13. The engine of claim 12, wherein the ignition voltage generation means are electrically connected to the electrical power source through a conductive slip ring mounted for rotation with the cylinder.

14. The engine of claim 11, wherein the crankshaft includes at least two crank throws, the second means being coupled to the crank throws, and wherein the improvement further comprises:

first and second concentric tubes aligned coaxially with the axis of rotation of the cylinder and journaled for rotation along said axis, each of the tubes having a proximal portion extending into the cylinder, and a distal portion spaced from the cylinder, one piston of each pair of pistons being rigidly fixed to the proximal portion of the first tube, and the other piston of each pair of pistons being rigidly fixed to the proximal portion of the second tube;
a first rigid arm having a first end fixed to the distal portion of the first tube, and a second rigid arm having a first end fixed to the distal portion of the second tube, the first and second arms each having a substantially elliptical aperture spaced from its firs end; and
fourth means for journaling each of the crank throws in the elliptical aperture of one of the arms so as to operatively engage each of the arms with one of the crank throws;
whereby the oscillation of the pistons axially rotates the first and second tubes in mutually opposite directions, thereby oscillating the first and second arms in mutually opposite directions to rotate the crankshaft by means of the engagement between the crank throws and the arms.

15. The engine of claim 14, Wherein the first ends of the first and second arms are respectively fixed to the first and second tubes so that there is substantially no relative movement between each of the first ends and the tube to which it is fixed.

16. The engine of claim 14, wherein the fourth means includes an annular ball bearing race installed on each of the crank throws, each of the ball bearing races being seated within the elliptical aperture of one of the arms so as to be movable therein along the axis of the aperture.

17. The engine of claim 14, wherein the crankshaft includes a plurality of integral balancing discs at spaced intervals along its length.

18. The engine of claim 17, wherein at least one of the balancing discs is journaled within an annular ball bearing race.

19. The engine of claim 14, wherein each of the pistons includes a pair of oppositely-directed, substantially conical end faces.

20. The engine of claim 14, wherein the engine comprises:
   two crank throws that are separated by approximately 180° of arc; and
   four mutually oscillating pairs of pistons, one of each pair being rigidly fixed to proximal portion of the first tube, the other of each pair being rigidly fixed to the proximal portion of the second tube;
   wherein the third means rotates the cylinder one complete revolution for each four revolutions of the crankshaft.

* * * * *

UNITED STATES PATENT AND TRADEMARK OFFICE
CERTIFICATE OF CORRECTION

PATENT NO.   : 5,203,287
DATED        : April 20, 1993
INVENTOR(S)  : Bruce C. Wiley It is certified that error appears in the above-identified patent and that said Letters Patent is hereby corrected as shown below:

Column 3, line 26, at the end of the line, change ":" to --;--;

Column 6, line 51, change "move" to --moves--;

Column 8, line 4, before "designations" insert --the--;

Column 8, line 53, "Further" should start with a new paragraph;

Column 11, line 38, after "means;" insert the following new line: --an electrical power source; and--;

Column 12, line 15, change "firs" to --first--; and

Column 12, line 26, change "Wherein" to --wherein--.

Signed and Sealed this

Twenty-first Day of June, 1994

Attest:

BRUCE LEHMAN

Attesting Officer

Commissioner of Patents and Trademarks